(12) United States Patent
Munjuluri et al.

(10) Patent No.: US 10,289,808 B2
(45) Date of Patent: May 14, 2019

(54) METHOD AND SYSTEM FOR SECURE DATA PROCESSING

(71) Applicant: Infineon Technologies AG, Neubiberg (DE)

(72) Inventors: Bala Nagendra Raja Munjuluri, Bangalore (IN); Prakash Nayak, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 706 days.

(21) Appl. No.: 14/137,378

(22) Filed: Dec. 20, 2013

(65) Prior Publication Data

US 2015/0178130 A1  Jun. 25, 2015

(51) Int. Cl.
*G06F 21/00* (2013.01)
*G06F 9/30* (2018.01)
*G06F 21/52* (2013.01)

(52) U.S. Cl.
CPC .............. *G06F 21/00* (2013.01); *G06F 9/30* (2013.01); *G06F 21/52* (2013.01)

(58) Field of Classification Search
CPC .................................................. G06F 9/4881
See application file for complete search history.

(56) References Cited

U.S. PATENT DOCUMENTS

| | | | | |
|---|---|---|---|---|
| 4,853,840 A * | 8/1989 | Shibuya | ................ | G06F 9/3844 712/237 |
| 6,427,224 B1 * | 7/2002 | Devins | ................ | G06F 17/5022 716/111 |
| 2002/0001233 A1 * | 1/2002 | Hotaka | .................... | G11C 7/24 365/189.04 |
| 2005/0002219 A1 * | 1/2005 | Choi | ................... | G11C 11/4078 365/149 |
| 2010/0296651 A1 * | 11/2010 | Tkacik | .................... | G09C 1/00 380/44 |

(Continued)

FOREIGN PATENT DOCUMENTS

DE  102011006000 A1  9/2012

OTHER PUBLICATIONS

AMTEL Corporation, "8501 Microcontroller Instruction Set," 2006, Section 1, pp. 1-50.

*Primary Examiner* — Henry Tsai
*Assistant Examiner* — John B Roche
(74) *Attorney, Agent, or Firm* — Murphy, Bilak & Homiller, PLLC

(57) ABSTRACT

Described herein are embodiments that relate to a method for use in data processing. An embodiment includes providing an arithmetic unit configured to perform any one in a set of operations. An embodiment includes providing a control register configured to hold control data. An embodiment includes providing in the set of operations, a control operation to provide process control, the control operation to operate on an operand that is coupled to the control data. A system for use in data processing is also disclosed having process registers and a control register. Further, a non-transitory computer-readable medium storing instruction code thereon for use in data processing is disclosed. When executed, the code causes a control operation forming part of a set of operations to operate on an operand that is coupled to control data held in a control register.

15 Claims, 7 Drawing Sheets

(56) References Cited

U.S. PATENT DOCUMENTS

| | | | | |
|---|---|---|---|---|
| 2011/0055638 A1* | 3/2011 | Lerouge | ............. | G06F 11/1004 |
| | | | | 714/48 |
| 2012/0246452 A1* | 9/2012 | Gammel | ................ | G06F 11/28 |
| | | | | 712/226 |
| 2012/0303948 A1* | 11/2012 | Auernhammer | .......... | H04L 9/00 |
| | | | | 713/150 |
| 2013/0019231 A1 | 1/2013 | Mangard et al. | | |

* cited by examiner

| Decimal | Binary | Instruction Name (short) | Instruction Name (long) |
|---|---|---|---|
| 1 | 0 0 0 0 0 0 | ADD | Add-to-Accumulator |
| 2 | 0 0 0 0 0 1 | SUB | Subtract-from-Accumulator |
| 3 | 0 0 0 0 1 0 | AND | Logical-AND-with-Accumulator |
| 4 | 0 0 0 0 1 1 | OR | Logical-OR-with-Accumulator |
| 5 | 0 0 0 1 0 0 | NOT | Logical-NOT-of-Accumulator |
| 6 | 0 0 0 1 0 1 | SHL | Shift-Accumulator-Left |
| 7 | 0 0 0 1 1 0 | SHR | Shift-Accumulator-Rght |
| 8 | 0 0 0 1 1 1 | INC | Increment-Accumulator |
| 9 | 0 0 1 0 0 0 | DEC | Decrement-Accumulator |
| 10 | 0 0 1 0 0 1 | LOD | Load-Accumulator-from-Memory |
| 11 | 0 0 1 0 1 0 | STO | Store-Accumulator-in-Memory |
| 12 | 0 0 1 0 1 1 | HLT | Halt |
| 13 | 0 0 1 1 0 0 | JMP | Jump |
| 14 | 0 0 1 1 0 1 | JMZ | Jump-if-Accumulator-is-Zero |
| 15 | 0 0 1 1 1 0 | JMN | Jump-if-Accumulator-is-Negative |
| 16 | 0 0 1 1 1 1 | JMF | Jump-if-FLAG-is-Set |
| 17 | 0 1 0 0 0 0 | ASG | Add-to-Signature |
| 18 | 0 1 0 0 0 1 | CSG | Check-Signature |

FIG. 3

METHOD AND SYSTEM FOR SECURE DATA PROCESSING

BACKGROUND

A microprocessor, herein also called programmable computing unit, is typically designed to process a sequence of instructions to perform a certain task. The sequence of instructions may also be referred to as program code. The program code is typically stored in a memory and provided to the computing unit at runtime. With a view to information security, it may be desired to protect the instructions from being tampered with such as being analysed, modified or skipped while they are stored in the memory or transmitted from the memory to the computing unit.

Operation of the microprocessor can be subject to attack and error. Both may occur during an execution of program code. In such a case instructions reaching the computing unit may differ from 'desired' instructions, i.e., instructions that would reach the computing unit, if attack or error had not taken place. Differences between the instruction actually processed by the computing unit and the desired instructions may have a random cause (error) or could be deliberately provoked by an intruder (attack). One attack can alter a sequence of process code execution so as to differ from a correct sequence of process code execution that would have been performed had the attack not taken place. Undesired instructions or altered sequences of process code execution, for example due to attack, should be detected.

SUMMARY

In an embodiment, a method as defined in the independent method claim is provided. In another embodiment, a system as defined in the independent system claim is provided. In yet another embodiment, a non-transitory computer-readable medium as defined in the independent computer-readable medium claim is provided. The dependent claims define further embodiments. It is to be noted that features of these embodiments may be combined with each other unless specifically noted to the contrary. For example, features of method embodiments may be implemented in embodiments of the system. For example, features of an embodiment of the system may be used to perform steps of an embodiment of the method.

This disclosure is directed to techniques for verification of instructions executing a task on a processor, for example high-level instructions that are compiled before executing on the processor. As an example, these techniques may be used to verify, by a first function expressed by an associated high-level instruction for execution by the processor, and by a second function called by the first function that is also expressed by one high-level instruction for execution by the processor. In some examples, the high-level instructions comprising the first and second function, respectively, are compiled into machine-level code prior to execution by the processor.

According to the techniques described herein, instead of verifying execution of the second function via execution of multiple high-level instructions to express the first function and the second function, respectively, at least one hardware component is directly used to verify task-related instructions, which may reduce a complexity of the high-level instructions used to implement the first and second verification functions. For example, using dedicated hardware to perform function call verification may confirm a number of high-level task-related instructions compiled and executed by the processor to execute the first and second functions. Reducing the number of instructions executed by the processor to execute the first and second instructions may in some examples be specifically desirable in low-cost applications where limited processing resources are available. Other advantages may also be accrued according to the various techniques described herein.

In some examples, the hardware component may comprise a storage module such as a register accessible by the processor. In some examples, the processor may directly access the hardware component based on execution of machine-level code. The processor may execute a high-level instruction that was compiled to machine level instructions that accesses the hardware component. In some examples, the hardware component may be a dedicated hardware component, that is only configured to store data used for high-level function call validation.

In one example, a device is described herein. The device includes a processor and a hardware component. The processor is configured to verify execution of at least one function comprising high-level instructions compiled to machine-level instructions and executed by the processor. The processor is further configured to, in response to high-level instructions compiled to machine-level instructions and executed by the processor, directly access the at least one hardware component to store a signature value at an address stored in the hardware component. The processor is further configured to, in response to the high-level instructions executed by the processor, directly access the at least one hardware component to modify the stored signature value at the address stored in the hardware component using the identification value to generate a verification value. The processor is further configured to, in response to the high-level instructions executed by the processor, output the generated verification value.

Described herein are embodiments that relate to a method for use in data processing. An embodiment comprises providing an arithmetic unit configured to perform any one in a set of operations. An embodiment comprises providing a storage medium, wherein the storage medium is coupled to the arithmetic unit and configured to store instruction code that when carried out by the arithmetic unit performs associated operations comprised in the set of operations to process a task. Operations can comprise elementary sub-operations. An embodiment comprises providing a process register configured to receive process data. An embodiment comprises providing a control register configured to hold control data. An embodiment comprises providing in the set of operations, a control operation to provide process control, the control operation to operate on an operand that is coupled to the control data.

In one aspect a system for use in data processing is disclosed. An embodiment comprises an arithmetic unit configured to perform any one in a set of operations. An embodiment comprises a storage medium, wherein the storage medium is coupled to the arithmetic unit and configured to store instruction code that when carried out by the arithmetic unit performs associated operations, comprised in the set of operations, to process a task. An embodiment comprises a process register configured to receive process data. An embodiment comprises a control register configured to hold control data. In an embodiment the control register is configured to only hold control data. In an embodiment the system provides, in the set of operations, a control operation to provide process control, the control operation to operate on an operand that is coupled to the control data.

In one aspect a non-transitory computer-readable medium storing instruction code thereon for use in data processing is disclosed. When executed, the code causes one or more processors to perform process operations forming part of a set of operations, the process operations to process a task and to write process data into a process register, and to perform a control operation forming part of the set of operations, and the control operation to operate on an operand that is coupled to control data held in a control register.

The described embodiments can be useful for secure processing. In comparison with conventional solutions at least one effect can be an increase in security at a given speed of processing a given task. Another effect can be an increase in speed of processing a given task at a given level of security.

This summary is submitted with the understanding that it will not be used to interpret or limit the scope or meaning of the claims. This summary is not intended to identify key features or essential features of the claimed subject matter, nor is it intended to be used as an aid in determining the scope of the claimed subject matter. Other methods, apparatus and systems are also disclosed. Those skilled in the art will recognise additional features and advantages upon reading the following detailed description, and upon viewing the accompanying drawings.

BRIEF DESCRIPTION OF THE DRAWINGS

FIG. 3 is a listing of an instruction set in accordance with some embodiments.

DETAILED DESCRIPTION

The claimed subject matter is now described with reference to the drawings. The detailed description references the accompanying figures. The same numbers are used throughout the drawings to reference like features and components. For purposes of explanation, numerous specific details are set forth in order to provide a thorough understanding of the claimed subject matter. It may be evident, however, that the claimed subject matter may be practised without these specific details.

Described herein are embodiments that in a first aspect relate to secure data processing.

A solution is to provide a so-called code flow control. Code flow control methods may be used to detect a difference between the instructions actually processed by the computing unit and instruction processing desired to complete a task. Code flow control can use a 'signature' passed from one routine ('caller') to another routine ('callee'). The callee routine can perform checks on the signature. Further, the callee routine can update the signature, for example for future checks to show the callee routine to have been invoked correctly. As a signature, instruction signature values can be used. Herein, an instruction signature value may also be referred to as signature value or as function signature or simply as signature. Instruction signature values can, for example, result from a sum of instructions executed during runtime of a program. At predetermined program points the instruction signature value can be checked to see if the value, for example a checksum, matches a reference value. A difference between the signature value and the reference value indicates a possible deviation between the actual program execution and an intended program execution.

Code flow control can require code flow control code—herein also shortly referred to as 'control code' as opposed to 'process code' that relates to processing of a task—to be executed that is added to the task-related code, i.e., to the process code, whose flow of execution is to be controlled. The execution of the control code does not contribute to processing the task and therefore is perceived to slow down execution of the process code. In one embodiment, security is enhanced by program or code flow control. At least one effect can be that, at a predetermined level of security and at predetermined speed of task-related data procession, secure data processing is faster.

Figure 1:
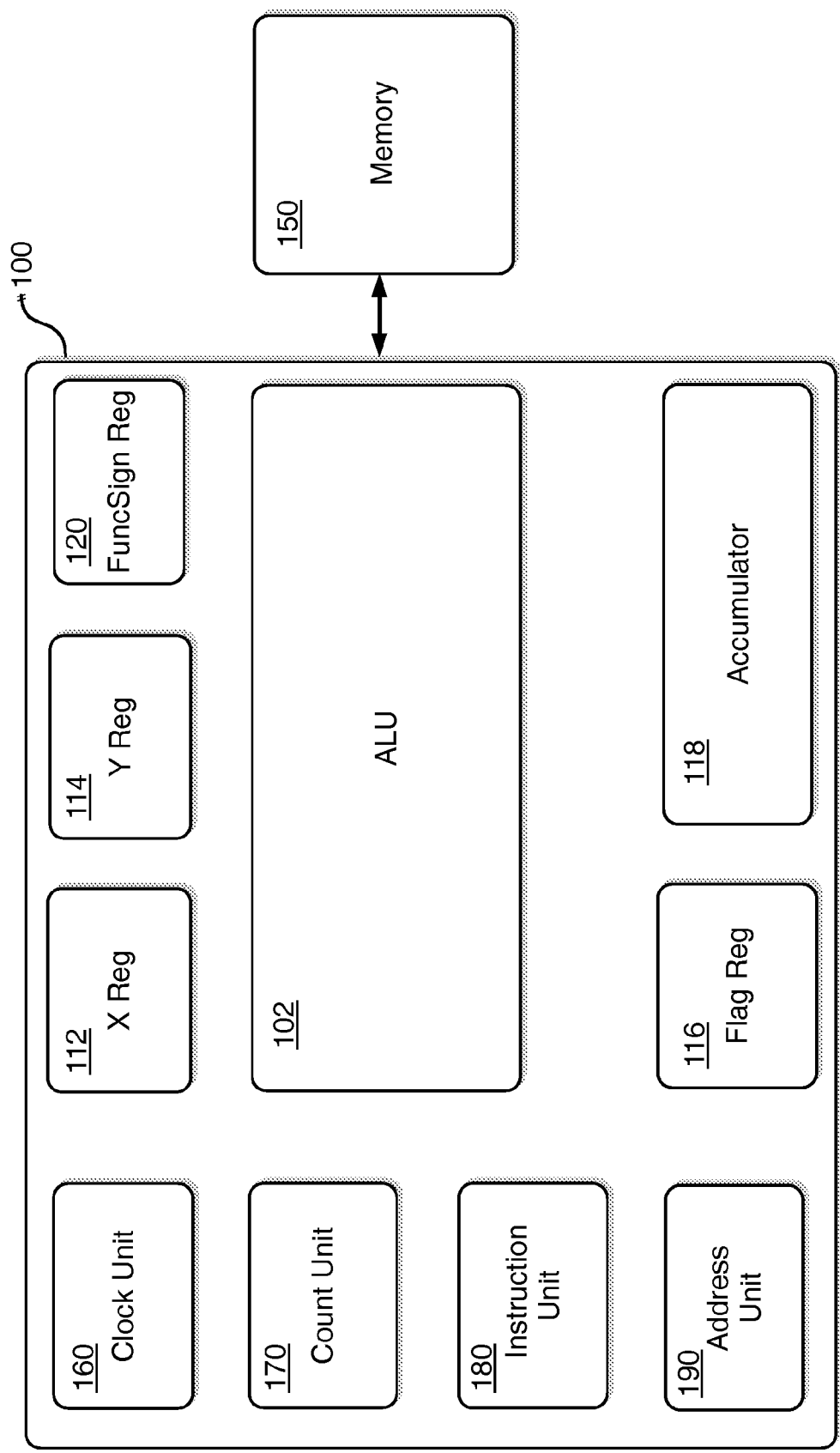
FIG. 1 is a block diagram illustrating a system in accordance with some embodiments.

An exemplary implementation of a processor system includes a computing unit 100 as shown in FIG. 1. Computing unit 100 comprises an algorithmic logic unit (ALU) 102 and is coupled to a memory unit 150. In an implementation computing unit 100 includes registers 112, 114, 116, 118 and 120. Without any compromise to generality, herein the registers will be called X register 112, Y register 114, flag register 116, accumulator 118 and signature register 120. Other names could be given for these registers of respectively same or similar function as the registers 112, 114, 116, 118 and 120 described herein so as to arrive at an implementation. Herein, as will become apparent below when describing implementations and embodiments, registers 112, 114, 116, and 118 are for use in typical processing and can accordingly be termed 'process registers'. In contrast, signature register 120 is configured for use in process flow control and can accordingly be termed 'control register'. Further, computing unit 100 can include a clock unit 160, a count unit 170, an instruction unit 180, and an address unit 190.

Reference will now be made to FIGS. 2A to 2E that illustrate in more detail various portions of the system shown in FIG. 1.

In an implementation ALU 102 includes logic circuitry. The logic circuitry in ALU 102 is configured to have computing unit 100 perform operations as defined by an instruction set for use with computing unit 100. ALU 102 has a set 101 of control line inputs that can be used to signal a selected instruction to be carried out by ALU 102. For example, set 101 of control lines can include a line 'Select-Add', a line 'Select-Subtract', a line 'Select-Shift-Left', a line 'Select-Shift-Right', a line 'Select-AND', a line 'Select-OR', a line 'Select-NOT', a line 'Select-Add-to-Signature', and a line 'Select-Check-Signature' to receive a control signal that a respective operation should take place. Further control lines are possible. Herein a reference to 'a line' or 'the line' can mean a reference to multiple lines such as bus lines in a typical bus unless explicitly stated otherwise, for example, by reference to 'a single line'. Operations and instruction set according to some embodiments will be discussed in more detail further below.

Registers 112, 114, 116, 118 and 120 are coupled to ALU 102. In one embodiment a control/data bus provides coupling to ALU 102. In one implementation the control bus has a number of lines equal to a number of six upper register bits, for example, in X register 112 and in Y register 114. In one exemplary implementation the data bus has a number of lines equal to a number of ten lower register bits in X register 112 and in Y register 114.

In one implementation, X register 112 and Y register 114 can be provided as 16 bit registers. In another implementation X register 112 and Y register 114 can be provided with a different number of bits, for example, as 32 bit registers. An X connection 111a is coupled to X register 112 for providing a control signal to X register 112. In an embodiment, X connection 111a can be a control line 'Load-X-from-Accumulator' to receive a signal that a value should be loaded from accumulator 118 into X register 112. Further, X register 112 can have a control line 'Load-X-Register-from-Memory' 111b to receive a control signal to X register 112 that a value should be loaded from memory 150. Similarly, Y connections 113a and 113b are provided and coupled to Y register 114 to receive control signals at Y register 114. In an embodiment, Y connections 113a and 113b can be one control line 'Load-Y-from-Memory' 113a for loading a value Y from memory unit 150 and another control line 'Load-Y-from-Instruction-Register' 113b for loading value Y from an instruction register. X connection 111a and Y connections 113a and 113b can be provided both as a single line or as multiple lines. In an implementation X connection 111a and/or Y connections 113a and 113b can be provided as lines of a bus. X register 112 can be used as a first operand register, for example, to hold one number to be used as first input for a calculation performed by ALU 102 that involves at least one input number. Y register 114 can be used as a second operand register, for example, to hold one number to be used as second input for a calculation performed by ALU 102 that involves a first input number and a second input number.

Flag register 116 can be provided as a single bit register. In another implementation flag register 116 may have a larger number of bits, for example, flag register 116 can be provided as an 8 bit register. Flag register 116 can be to receive flag output from ALU 102. For example, flag output from ALU 102 can be a single bit to signal a bit carried out of accumulator 118 in a shift operation. Flag register 116 can be configured to output flag register output data via an output line 125. A control line 115 can be coupled to flag register 116 as a flag control line 'Load-Flag-from-ALU' to signal to flag register 116 that a flag should be loaded from ALU 102. In one implementation control lines 115 can be coupled to flag register 116, for example, to form a signal bus.

As X register 112 and Y register 114, also accumulator 118 can be provided as a 16 bit register. Other implementations where accumulator 118 has a different number of bits can be provided as well. Accumulator 118 is configured to receive data from ALU 102. Further, accumulator 118 can be configured to receive data from memory unit 150. Accumulator 118 can be configured to output accumulator output data via an output line 127 coupled to a data bus (not shown), such as a 16-bit combined instruction/address bus. Accumulator 118 can further be coupled to an instruction register 187 discussed below. In an embodiment accumulator 118 can have a set of accumulator control line inputs 117. For example, accumulator control lines 117 can include a line 'Load-Accumulator-from-ALU' to receive a control signal a value should be loaded from ALU 102 into accumulator 118, a line 'Load-Accumulator-from-Memory' to receive a control signal a value should be loaded from memory unit 150 into accumulator 118, a line 'Load-Accumulator-from-Instruction-Register' to receive a control signal that a value should be loaded from an instruction register 187 into accumulator 118, a line 'Increment-Accumulator' to receive a control signal that a value in accumulator 118 should be incremented, a line 'Decrement-Accumulator' to receive a control signal that a value in accumulator 118 should be decremented, a line 'Store-to-Memory' to receive a control signal that a value in accumulator 118 should be stored to a register in register file 152 of memory unit 150, a line 'Add-to-Signature' to receive a control signal that a value should be added to a signature value, and a line 'Check-Signature' to receive a control signal that the signature value should be checked against a reference value. Other control lines are possible.

Figure 2A:
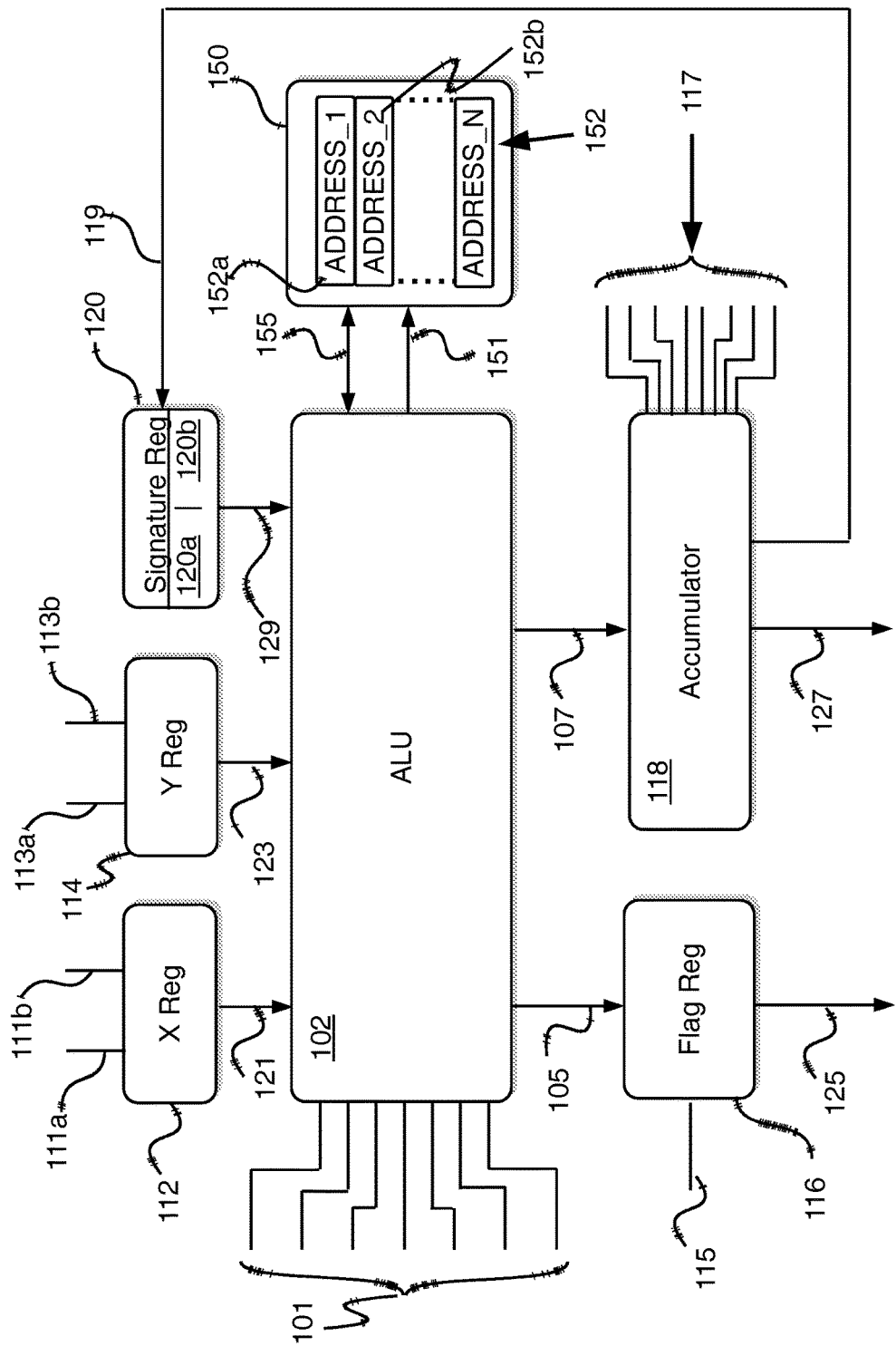
FIG. 2A is a block diagram illustrating portions of the system in FIG. 1.
Figure 2B:
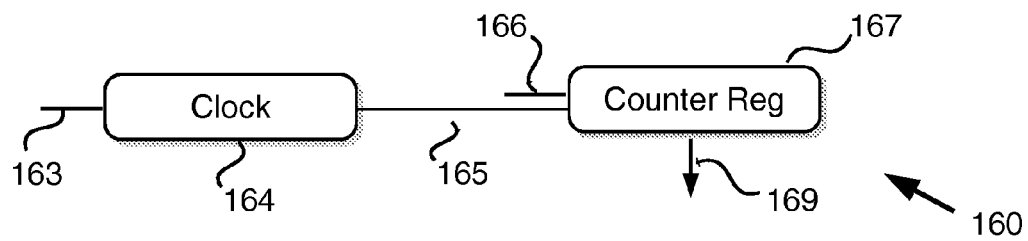
FIG. 2B is a block diagram illustrating a further portion of the system in FIG. 1.

In an implementation computing unit 100 can further comprise a clock unit 160 (FIG. 2B). Clock unit 160 can be provided with a step counter register 167 to hold a value incremented in step with execution of operations of an instruction. Clock unit 160 can have an output 169 coupled to control circuitry (not shown). In an implementation step counter register 167 has an input coupled to a clock 164 that is configured to provide a control signal 'Increment-Counter' on a control line 165 to step counter register 167. Clock 164 can have a control line 'Stop' 163 to receive a stop signal. Further, step counter register 167 can have a control line 'Reset-Counter' 166 to receive a reset signal. Thus, step counter register 167 can be configured for reset upon execution of an instruction to restart counting steps of a subsequent instruction.

Figure 2C:
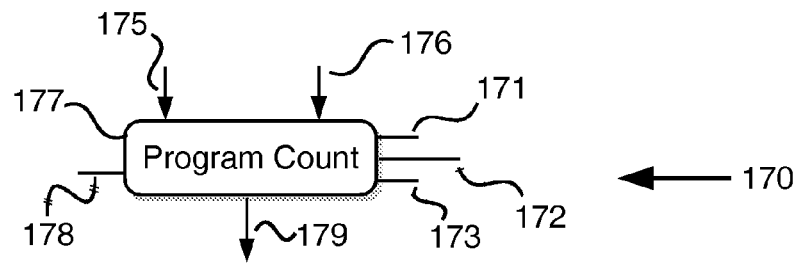
FIG. 2C is a block diagram illustrating another portion of the system in FIG. 1.

In an implementation computing unit 100 can further comprise count unit 170 (FIG. 2C). Count unit 170 can be provided as a program counter register 177 for holding a value indicative of the location in memory unit 150 where the next instruction to be executed, i.e., after execution of the instruction presently loaded into instruction register 187, can be found. Counter register 177 is configured to hold instructions that have a six bit instruction code immediately followed by a 10 bit operand code. Counter register 177 can be coupled to memory unit 150, for example by a line 175, and also to instruction register 187, for example by a line 176. Counter register 177 can have an output 179 coupled to a data bus (not shown), such as a 16-bit combined instruction/address bus, to output data from counter register 177. Counter register 177 can have a control line 'Load-Program-Counter-from-Instruction-Register' 171 to receive a control signal that a value should be loaded from instruction register 187 into counter register 177. Counter register 177 can have a control line 'Load-Program-Counter-from-Memory' 172 to receive a control signal that a value should be loaded from memory unit 150 into counter register 177. Counter register 177 can have a control line 'Increment-Program-Counter' 173 to receive a control signal to counter register 177 that a value in counter register 177 should be incremented. Further, counter register 177 can have a control line 'Reset-Program-Counter' 178 to receive a reset program signal. Thus, counter register 177 can be configured for reset upon execution of an instruction to halt program flow.

Figure 2D:
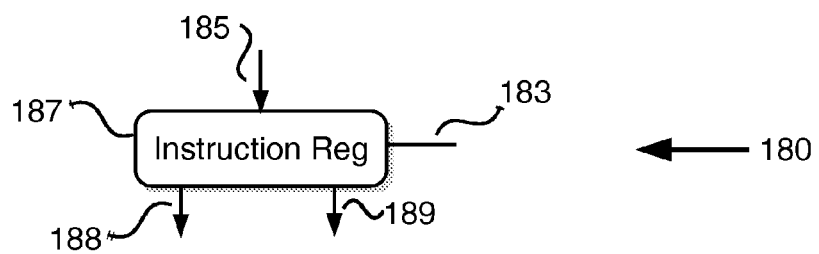
FIG. 2D is a block diagram illustrating yet a further portion of the system in FIG. 1.

In an implementation computing unit 100 can further comprise instruction unit 180 (FIG. 2D). Instruction unit 180 can be provided as an instruction register 187 configured to load instructions from memory unit 150 for execution by ALU 102. An input 185 of instruction register 187 can be coupled to memory unit 150. Instruction register 187 can have an output 188 coupled to a control bus (not shown) such as a 6-bit bus. Instruction register 187 can have an output 189 coupled to a data bus (not shown) such as a 10-bit bus. Instruction register 187 can have a control line 'Load-Instruction-Register-from-Memory' to receive a control signal that a value should be loaded from memory unit 150 into instruction register 187.

Figure 2E:
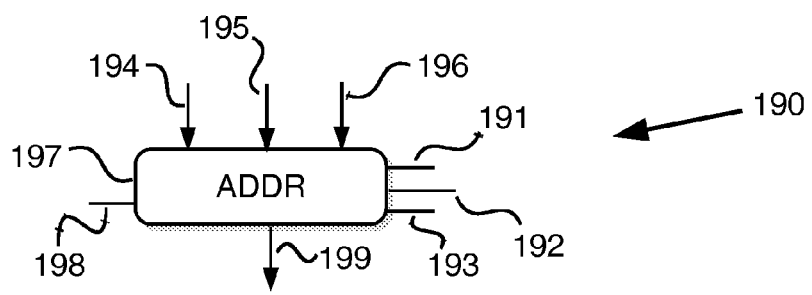
FIG. 2E is a block diagram illustrating yet another portion of the system in FIG. 1.

In an implementation computing unit 100 can further comprise address unit 190 (FIG. 2E). Address unit 190 can be provided as an address register 197 configured to hold an address. Address register 197 can be used in control of access to memory unit 150. Address register 197 can have an input 194 coupled to counter register 177. Address register 197 can have an input 195 coupled to instruction register 187. Address register 197 can have an input 196 coupled to Y register 114. Address register 197 can be configured to output address register output data via an output 199 coupled to a data bus (not shown), such as an address bus. Address register 197 can have a control line 'Load-Address-Register-from-Program-Counter' 191 to receive a control signal that a value should be loaded from counter register 177 into address register 197. Address register 197 can have a control line 'Load-Address-Register-from-Instruction-Register' 192 to receive a control signal that a value should be loaded from instruction register 187 into address register 197. Address register 197 can have a control line 'Load-Address-Register-from-Y-Register' 193 to receive a signal that a value should be loaded from Y register 114 into address register 197. Address register 197 can have a control line 'Load-Address-Register-from-Signature-Register' 198 to receive a control signal to address register 197 that an address value should be loaded from signature register 120.

In an implementation computing unit 100 can have other registers not shown in FIGS. 2A to 2E.

Now again reverting to FIG. 2A, signature register 120 can be provided as a special function register. Signature register 120 can be coupled to ALU 102 by a signature read line 129. In an embodiment signature register 120 is configured to only hold control data. In an implementation signature register 120 is to hold an address value. A line 119 can be used to provide the address value to signature register 120.

ALU 102 can use registers 112, 114, 116 and 118, for example, as follows: X register 112 and Y register 114 can hold numbers to be used as input via lines 121 and 123, respectively, for a computation to be performed by ALU 102. A result of that computation can be loaded via line 107 into accumulator 118. Further, flag output from ALU 102 can be loaded via line 105 into flag register 116. Flag output can hold information about the result of the computation performed by ALU 102.

Memory unit 150 can be provided as a register file with multiple registers at respective addresses. In the example shown in FIG. 2A memory unit 150 has N memory registers at address values 'ADDRESS_1' to 'ADDRESS_N'. Coupling of memory unit 150 to computing unit 100 is provided by an address bus 151 and by a data bus 155. Address bus 151 has one or more lines that can be used to address a memory register 152b in register file 152 of memory unit 150, for example at address value 'ADDRESS_2'. A data bus 155 can be used to write data into the addressed memory register 152b and to read data from the addressed memory register 152b.

Memory unit 150, amongst others, can store instructions of a computer program for execution by computing unit 100. Instructions used in the computer program can form part of an instructions set for use with computing unit 100.

Generally, typical instructions can be grouped into transfer instructions, arithmetic instructions, Boolean instructions, shift instructions, bit instructions, branch instructions, and cache instructions. The afore-mentioned instructions can thus be used in processing data to complete a task. Herein, instructions used in processing data to complete a task will be referred to as process instructions. As an example of an instruction set including process instructions, FIG. 3 illustrates a table listing instructions included in an example of an instruction set 200 for use with computing unit 100. Instruction set 200 shown in FIG. 3 includes eighteen instructions. In the table of FIG. 3 the left-most column (first column) states a decimal number identification of each instruction that will also be used herein as reference numeral. The second column from the left states a binary number identification of each instruction for use in processing. The third column from the left states a short name of each instruction. The right-most column (fourth column) states a long name of each instruction. The binary identification of each instruction may be used for storing as a representation of the respective instruction when storing the instruction, for example, in register file 152 of memory unit 150.

Instruction set 200 has elementary process instructions 1 to 16. Those skilled in the art will not have difficulty to implement exemplary process instructions 1 to 16 as these instructions are self-explanatory in their respective long name. In particular, process instructions can comprise typical data transfer instructions that move information between or within components of the processing system, such as LOD instruction 10 to load accumulator 118 from memory 150, arithmetic and logic instructions that cause ALU 102 to perform a computation such as ADD instruction 1 to add a value to another value in accumulator 118, compare instructions that compare two values and set an indicator on the basis of the results of the compare, and branch instructions that influence process flow such as JMP instruction 13 that causes process execution to jump, and other instructions for use in task-related processing. Other instruction sets with process instructions can be expanded to include control instructions as disclosed herein. For example, a typical so-called 8051 instruction set (not shown) that is used, for example, in an IBM 8051 processor could be expanded to include control instructions as disclosed herein.

As an example, execution of a process instruction, ADD instruction 1, is briefly described. According to ADD instruction 1, computing unit 100 is operated to add a first value and a second value for the result to be output from accumulator 118. Thus, ADD instruction 1 has two operands. A first operand is a value in accumulator 118. A second operand is a value stored at a location in memory unit 150. In one implementation, in operation according to ADD instruction 1, ALU 102 can perform a number of sub-operations, herein also referred to as 'steps'. In particular, ALU 102 can perform three steps within one cycle of 'fetch and execute', wherein ALU 102 fetches ADD instruction 1 from memory 150, and then loads the instruction into instruction register 187 of computing unit 100. Subsequently, ALU 102 can carry out ADD instruction 1. To fetch ADD instruction 1 from memory, ALU 102 provides a signal on control line 'Load-Address-Register-from-Program-Counter' 191 to address register 197. Upon loading the address into address register 197 where ADD instruction 1 is stored in memory unit 150, ALU 102 provides a signal on control line 'Load-Instruction-Register-from-Memory' 183 to instruction register 187 in order to load ADD instruction 1. Upon loading ADD instruction 1 from memory 150 into instruction register 187, ALU 102 provides a signal on control line 'Increment-Program-Counter' 171 to counter register 177 in order to increment a value in counter unit 170 to an address in memory unit 150 where an instruction is stored that is next to be executed. For execution of the loaded ADD instruction 1, ALU 102 can provide a signal on control line 'Load-Address-Register-from-Instruction-Register' 192 to address register 197 in order to load the address. ALU 102 provides a signal on control line 'Load-X-from-Accumulator' 111a to X register 112. Further, ALU 102 provides a signal on control line 'Load-Y-from-Memory' 113b to Y register 114. In accordance with ADD instruction 1, ALU 102 is provided with a signal on control line 'Select-Add' 101. ALU 102 provides a signal on control line 'Load-Accumulator-from-ALU' 117 to accumulator 118. Further, ALU 102 provides a signal on control line 'Load-flag-from-ALU' 115 to flag register 116 to be loaded into flag register 116. ALU 102 can be provided with another signal on control line 'Select-Add' 101 in order to ensure sufficient time for completion of loading the result of ADD instruction 1 into accumulator 118. Finally, ALU 102 provides a signal on control line 'Reset-counter' to clock counter 167.

In contrast to the above described process instruction, below, two exemplary control instructions will be described in more detail: 'Add-to-Signature' instruction 17 and 'Check-Signature' instruction 18, herein also called ASG instruction 17 and CSG instruction 18, respectively.

Having regard to 'Add-to-Signature' instruction 17, in order to fetch ASG instruction 17 from register file 152 in memory unit 150, ALU 102 provides a signal on control line 'Load-Address-Register-from-Program-Counter' 191 to address register 197. An address value is loaded from counter register 177 into address register 197. The address value represents an address in memory unit 150 where ASG instruction 17 is stored. In order to load ASG instruction 17, ALU 102 provides a signal on control line 'Load-Instruction-Register-from-Memory' 183 to instruction register 187. Upon loading ASG instruction 17 from memory unit 150 into instruction register 187, ALU 102 provides a signal on control line 'Increment-Program-Counter' 171 to counter register 177 in order to increment a value in counter register 177 to an address in memory unit 150 where an instruction is stored that is next to be executed. For execution of loaded ASG instruction 17, ALU 102 can provide a signal on control line 'Load-Address-Register-from-Signature-Register' 198 to address register 197 in order to load a further address value. The further address value can represent an address in memory unit 150 where a current instruction signature value is stored. ALU 102 can provide a signal on control line 'Load-X-from-Memory' 111b to X register 112. Further, ALU 102 can provide a signal on control line 'Load-Y-from-Instruction-Register' 113b for loading value Y from instruction register 187. In accordance with ASG instruction 17, ALU 102 is provided with a signal on control line 'Select-Add-to-Signature' 101. On receiving this input, ALU 102 performs, for example, as described above with respect to ADD instruction 1, an add operation on values in X register 112 and Y register 114. ALU 102 provides a signal on control line 'Load-Accumulator-from-ALU' 117 to accumulator 118. Further, ALU 102 provides a signal on control line 'Store-to-Memory' 117 to accumulator 118 so as to store the value in accumulator 118 to a location in register file 152 of memory unit 150 pointed to by the value in address register 197. Also, ALU 102 can provide a signal on control line 'Reset-Clock' 166 to clock counter 167.

Now having regard to 'Check-Signature' instruction 18, in order to load CSG instruction 18 from memory unit 150, ALU 102 provides a signal on control line 'Load-Address-Register-from-Program-Counter' 191 to address register 197. An address value is loaded from counter register 177 into address register 197. The address value represents an address in memory unit 150 where CSG instruction 18 is stored. In order to load CSG instruction 18, ALU 102 provides a signal on control line 'Load-Instruction-Register-from-Memory' 183 to instruction register 187. Upon loading CSG instruction 18 from memory unit 150 into instruction register 187, ALU 102 provides a signal on control line 'Increment-Program-Counter' 171 to counter register 177 in order to increment a value in counter unit 170 to an address in memory unit 150 where an instruction is stored that is to next to be executed. For execution of the loaded CSG instruction, ALU 102 can provide a signal on control line 'Load-Address-Register-from-Signature-Register' 198 to address register 197 in order to load a further address value. The further address value can represent an address in memory unit 150 where a current instruction signature value is stored. ALU 102 can provide a signal on control line 'Load-X-from-Memory' 111b to X register 112. Further, ALU 102 can provide a signal on control line 'Load-Y-from-Instruction-Register' 113b for loading a value Y from instruction register 187. In accordance with CSG instruction 18, ALU 102 is provided with a signal on control line 'Select-Check-Signature' 101. On receiving this signal, ALU can perform a compare operation to compare the value in X register 112 to the value in Y register 114. For the purpose of comparison, similar to the addition operation performed as described above with respect to ADD instruction 1, in one implementation CSG instruction 18 can perform a subtraction operation, for example, as associated with SUB instruction 2, whereby one operand is subtracted from the other operand. CSG instruction 18 is completed, if the subtraction result is zero, so that secure process operation 330 can be continued. However, should the subtraction result be other than zero, ALU 102 can provide a signal on control line 'Reset-Program-Counter' 178 to program counter 170. Also, ALU 102 can provide a signal on control line 'Reset-Clock' 166 to clock counter 167.

Figure 4:
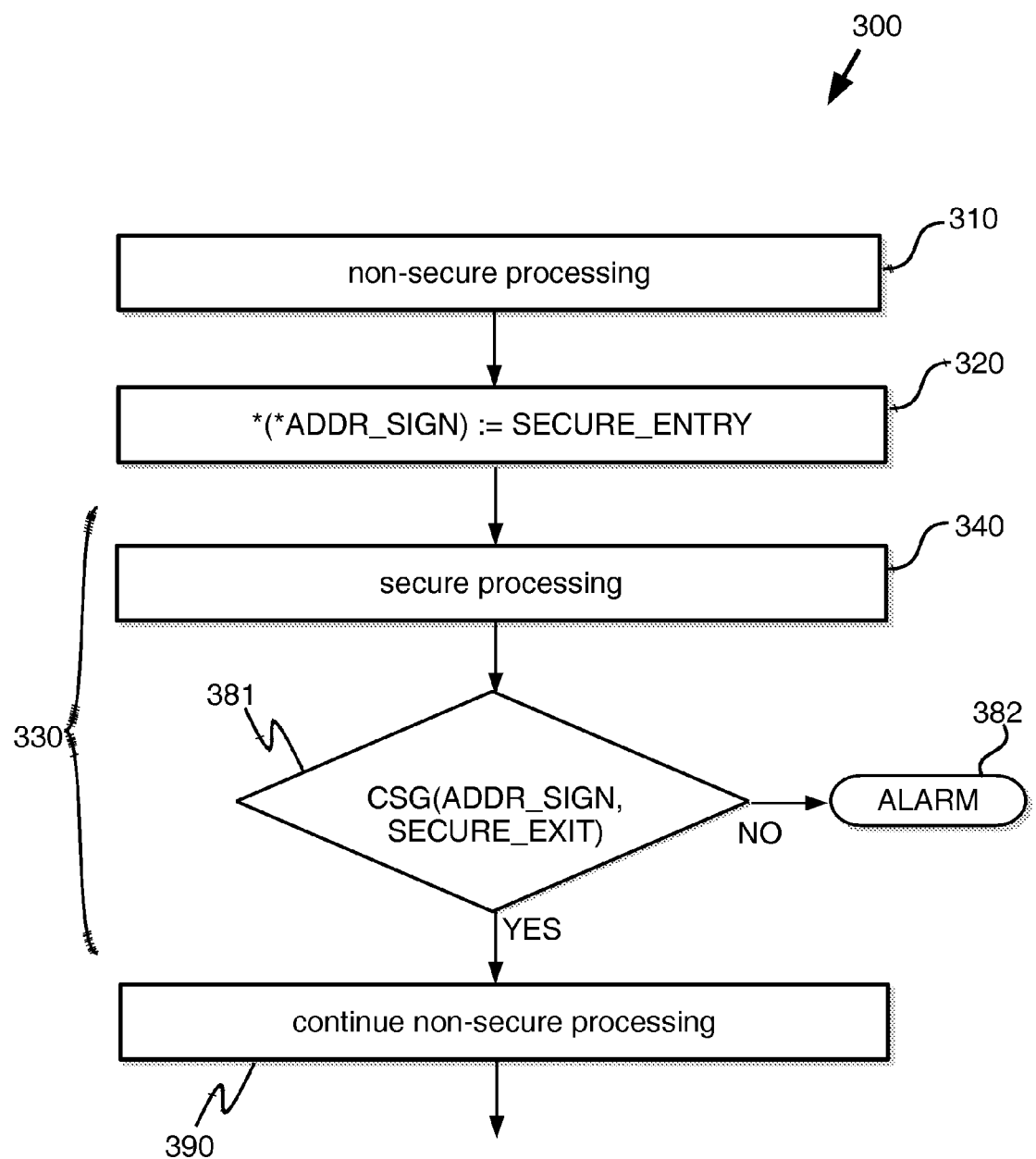
FIG. 4 is a flow chart illustrating a method in accordance with some embodiments.

FIG. 4 shows a flow chart that illustrates an exemplary embodiment of a method that uses function signatures for code flow control. A process 300 is to complete a given task as the person skilled in the art will define in an implementation. Process 300 can have non-secure process portions and at least one secure process portion. Herein 'non-secure' means that a function signature is not used as opposed to a 'secure' process portion that uses an instruction signature value for control of secure code flow. Thus, a non-secure process portion can be subject to other security measures than using function signatures. A secure process portion may not be subject to security measures other than using a function signature. For example, at reference numeral 310 process 300 is a non-secure process portion, at reference numeral 330 process 300 includes a secure process portion, and at reference numeral 390 process 300 is a non-secure process portion. For the sake of readability, when herein referencing a portion of process designated by a reference numeral, oftentimes the wording 'reference numeral' will be omitted in front of the reference numeral.

In an implementation, computing unit 100 coupled to memory unit 150 can be used to perform execution of process 300. In an embodiment, process 300 can use at least some of process instructions 1 to 16 of the instruction set shown in FIG. 3. Secure process portion 330 can additionally use control instructions ASG instruction 17 and CSG instruction 18.

Figure 5A:
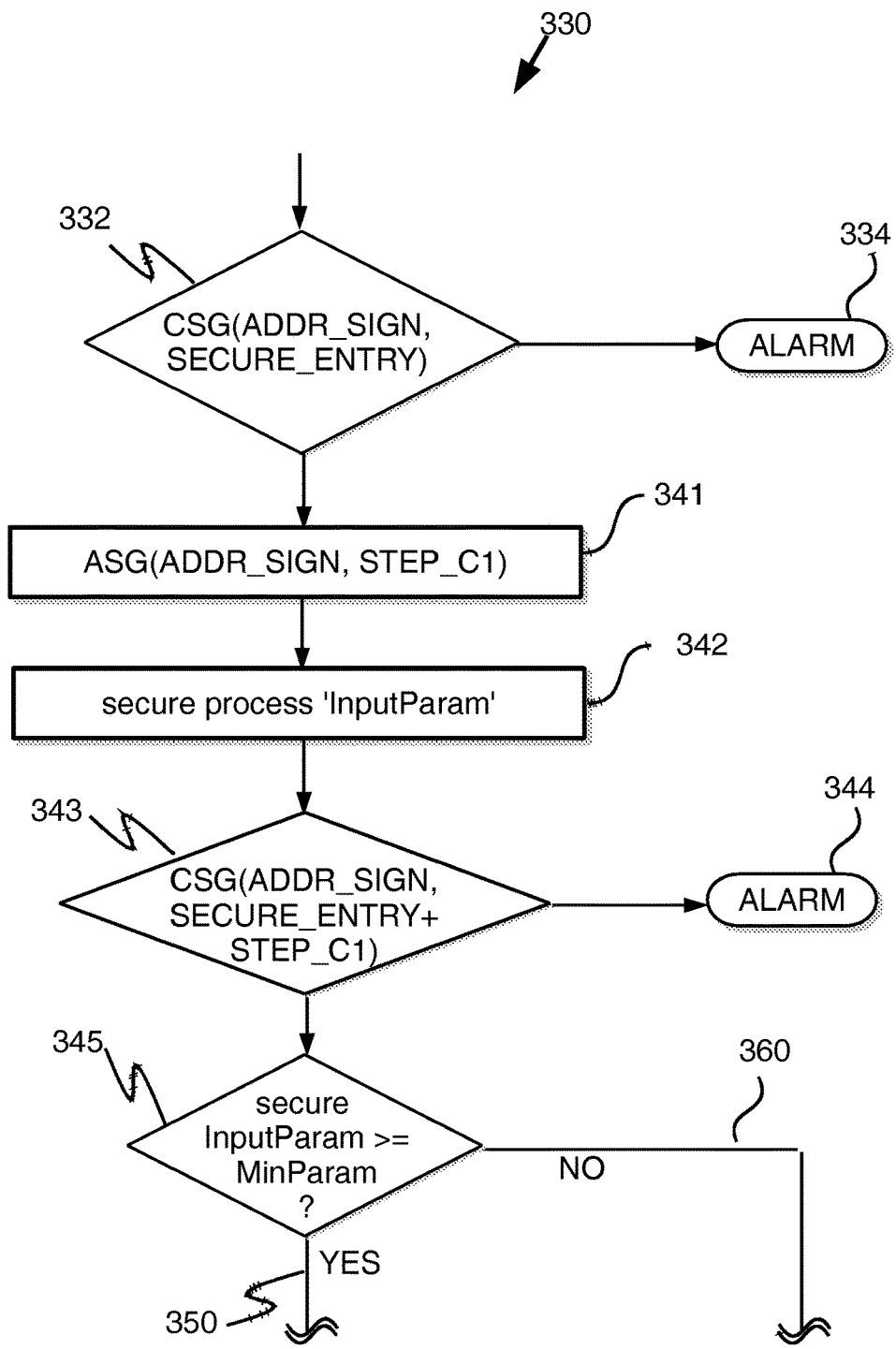
FIG. 5A shows a first portion of the flow chart in FIG. 4 illustrating the method shown there in more detail.

In executing non-secure process portion 310, process 300 can, at 320, provide a constant instruction signature value 'SECURE_ENTRY' and then enter secure process portion 330. In an implementation using multiple instruction signature values, for example one to be counted up or stepped up and another one to be counted down or stepped down during execution of secure process portion 330, each signature value can be unique. Next, in process portion 330, process 300 can execute one or more further secure process steps 340 that may include execution of process instructions as well as execution of control instructions. For example, as shown in FIG. 5A, at 341, process 330 can execute control instruction ASG instruction 17 so as to operate 'Add-to-Signature' on the instruction signature value. This will be described in more detail below. In one embodiment, finally in secure process portion 330, at 381, control instruction CSG instruction 18 is performed so as to operate 'Check-Signature' on the instruction signature value and a reference value. In case a result of CSG instruction 18 is other than predetermined, i.e., other than expected, process flow can, for example, be directed to ALARM 382. However, if the result of CSG instruction 18 is as expected, then process 300 is continued with non-secure process flow 390.

Figure 5B:
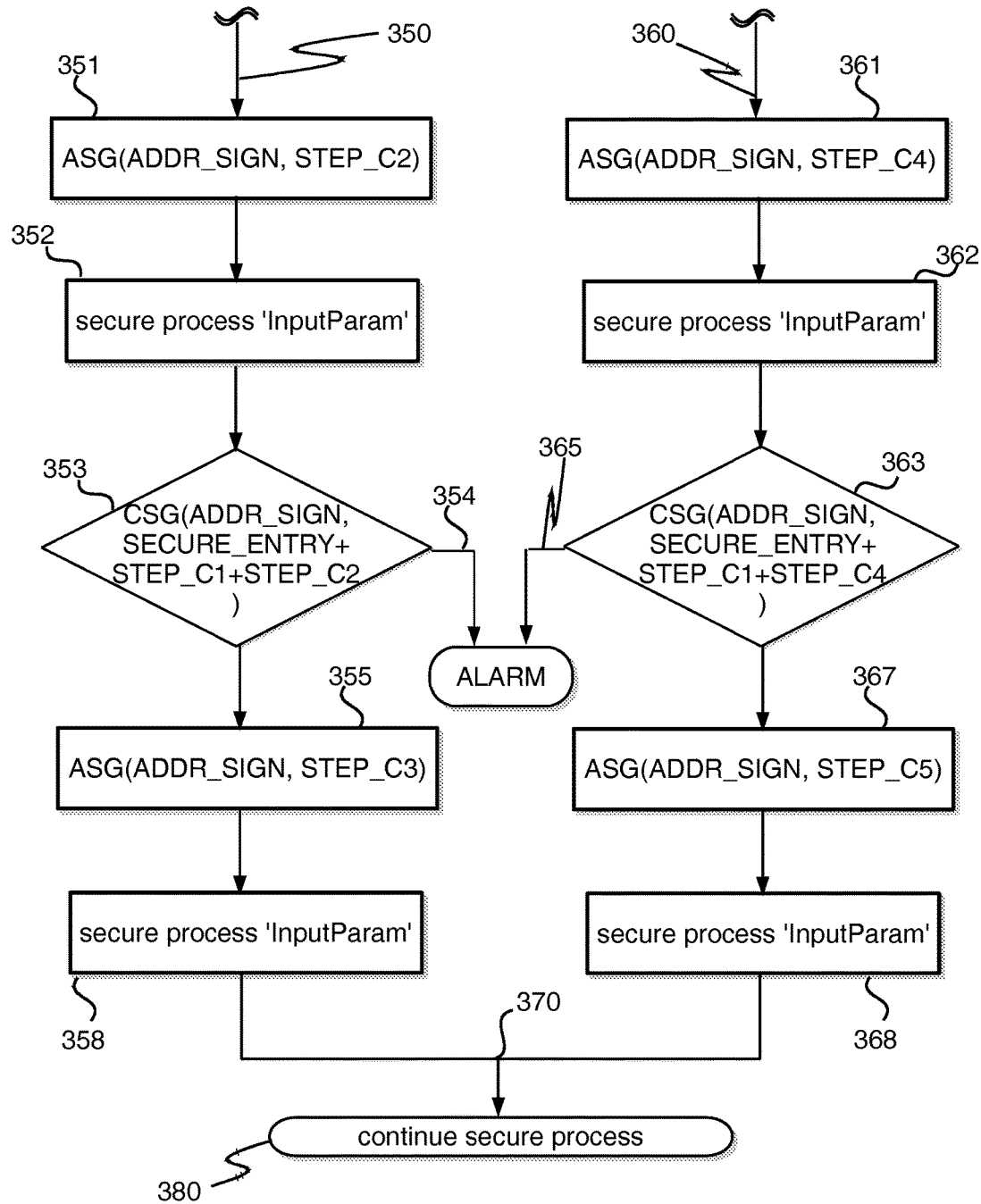
FIG. 5B shows a second portion of the flow chart in FIG. 4 illustrating the method shown there in more detail.

Reference is now made to FIGS. 5A and 5B that show portions of process 300, in particular secure process portion 330, in more detail. As in some implementations computing unit 100 in co-operation with memory unit 150 coupled to computing unit 100 can be used to perform secure process portion 330, reference is also made to FIGS. 2A to 2E.

Having regard to instruction signature values, in some embodiments, instruction signature values can be predefined when initialising process 300 using, for example, a 'definitions' section in a program that, when executed, performs steps of process 300. In some embodiments, signature values are predefined as constants never to be changed during execution of process 300. Instruction signature values can be predefined irrespective of any use of the respective signature value in process 300. Definition of predefined instruction signature values, even though for use in secure process portion 330, can be performed in non-secure process portions as shown, for example, in the flow chart illustrated in FIG. 4, where initial instruction signature value 'SECURE_ENTRY' is defined in non-secure process portion at 310, to be referenced at 320 before entry into secure process portion 330. In some implementations, initial instruction signature value 'SECURE_ENTRY' can be arbitrarily defined, for example, as expressed by the following pseudo code:

define SECURE_ENTRY 0x5AD2

Further having regard to initial instruction signature value 'SECURE_ENTRY', a value in signature register 120 (FIG. 2A) represents a address value 'ADDRESS_1' of an address in memory unit 150 that identifies a memory register 152a in register file 152 of memory unit 150 where the instruction signature value is stored. Thus, the address value 'ADDRESS_1' in signature register 120 can form a pointer that points to memory register 152a. Accordingly, a value held by signature register 120 is set, for example, in order to point to memory register 152a, to the value 'ADDRESS_1', as expressed by the following pseudo code:

define *ADDR_SIGN_ADDRESS_1

Constant initial instruction signature value 'SECURE_ENTRY' may be stored in memory register 152a.

Now having regard to the process flow, upon entry into secure process portion 330, at 332, control instruction CSG instruction 18 can be executed ('Check-Signature'). Instruction 'Check-signature' 18 can be called, for example, as stated by the following pseudo code:

CSG (ADDR_SIGN, SECURE_ENTRY)

wherein 'ADDR_SIGN' identifies signature register 120, and wherein 'SECURE_ENTRY' is the constant initial signature value. In some embodiments, CSG instruction 18 requires at least two operands, a first operand is a value loaded from signature register 120. In the embodiments illustrated in FIG. 2A the value 'ADDR_SIGN' equals the value 'ADDRESS_1'. Thus, value 'ADDR_SIGN' points to memory register 152a as memory register 152a has the address value 'ADDRESS_1'. Memory register 152a stores a value to be compared to a second operand provided by initial instruction signature value 'SECURE_ENTRY' as predefined earlier on in process 300. In implementations that uses merely a single signature register, as in some of the present examples only signature register 120 is used, only the second operand can vary. Consequently, in this case, CSG instruction 18 can also be written without stating the first operand 'ADDR_SIGN', i.e.,

CSG (SECURE_ENTRY)

whereby savings in code can be made. However, herein CSG instruction 18 will further be shown with both operands.

For the purpose of comparison, as described above, in one implementation CSG instruction 18 can perform a subtraction operation, and, should the subtraction result be other than zero, then the comparison of CSG instruction 18 finds the value presently written into signature register 120 to differ from the predefined check value, and in this case in some embodiments CSG instruction 18 can operate so as to jump to another portion of secure process portion 330 that for example, at 334, outputs an alarm. Below, when referring to CSG instruction 18, it will be understood that in case of an inequality of the second operand to the value written into the register pointed to by the value written into signature register 120, CSG instruction directs process flow into a condition that may not serve to execute the task of process 300 but that can rather draw user's or another person's attention to occurrence of an error in process 300 and/or, as the case may be, halt flow of process 300, or possibly continue flow of process 300 in some safe mode.

CSG instruction 18 operates to control secure process flow. In particular, CSG instruction 18 may verify the instruction signature value upon entry into secure process portion 330 and thereby confirm the present call of secure process portion 330 to be valid or legitimate. In effect, execution of CSG instruction 18 can help to confirm that transit from non-secure process portion 310 to secure process portion 330 was correctly performed without error. At least one effect of using the instruction 'Check-signature' 18 can be a good measure of security at little expense in terms of computation. For example, in the present implementation, merely two bytes of code are required to invoke CSG instruction 18: six bit for instruction coding and ten bit for address coding. In some other implementations merely three bytes of code may be required in a program to call CSG instruction 18: for example, one byte for instruction coding, and two bytes for address coding. In comparison, a program code that did not use CSG instruction 18 to operate on the signature value at address 'ADDRESS_1' pointed out by the value 'ADDR_SIGN' stored in signature register 120 could require fourteen bytes or more. Accordingly, embodiments described herein can much reduce storage required to hold instructions for secure processing. Some embodiments can increase speed of program execution, since invocation of CSG instruction 18 ('Check-Signature') executes much faster than stepwise performance of an equivalent routine programmed in code.

In an alternate embodiment (not shown), prior to execution of CSG instruction 18, control instruction 'Add-to-Signature' (ASG) 17 can be invoked to add a predefined initial step signature value to the instruction signature value stored in memory register 152*a*. ASG instruction 17 can thus be called, for example, as stated in the following pseudo code:

ASG (ADDR_SIGN, STEP_C0)

wherein 'ADDR_SIGN' identifies signature register 120, and 'STEP_C0' is the predefined initial step instruction signature value. Similar to what was described above with respect to the initial instruction signature value 'SECURE_ENTRY', the initial step value 'STEP_C0' can be arbitrarily defined, for example, as by the following pseudo code:

define STEP_C0 0x0002

Having regard to ASG instruction 17 ('Add-to-Signature') in some embodiments, ASG instruction 17 operates to add a first summand to a second summand, wherein the first summand may be a step signature value and the second summand can be the current instruction signature value as stored in register file 152 at the location pointed to by the value in signature register 120. ASG instruction 17 may operate to write the result into register file 152 at the location pointed to by the value in signature register 120. Thus, ASG instruction 17 can provide an updated instruction signature value for use in a future call of a control instruction such as ASG instruction 17 or CSG instruction 18. Unlike what was described above with respect to the process instruction, ADD instruction 1, to add a value from X register 112 to accumulator 118, the control instruction 'Add-to-Signature', ASG instruction 17, may use merely one of the summands, the step signature value, as operand. In some implementations, in particular in an embodiment that uses more than one signature register, ASG instruction 17 may have as another operand the value 'ADDR_SIGN'. Thus, ASG instruction 17 can load the value 'ADDRESS_1' from signature register 120 that indicates where to find the instruction signature value in register file 152 that is to be used as the other of two summands in the operation of signature addition. When using a single signature register, as in the present examples signature register 120, since only the second operand can vary, ASG instruction 17 can also be used without the first operand 'ADDR_SIGN', i.e., stated in pseudo code:

ASG (STEP_C0)

whereby savings in code can be made. However, herein ASG instruction 17 will further be shown with two operands.

As second operand can be provided by the initial step value 'STEP_C0' as predefined earlier on in process 300 to provide a second summand in the signature addition. In this alternate embodiment, in order to check process flow upon entry into secure process portion 330, CSG instruction 18 can thus be invoked, for example, as stated in the following pseudo code

CSG (ADDR_SIGN, SECURE_ENTRY+STEP_C0)

wherein 'ADDR_SIGN' identifies signature register 120, 'SECURE_ENTRY' is the predefined initial signature value, and 'STEP_C0' is the predefined initial step signature value. In this embodiment, operation of CSG instruction 18 is on a pointer to a first referenced value and on a value that results from an addition of initial signature value 'SECURE_ENTRY' and initial step signature value 'STEP_C0'.

If upon entry into secure process portion 330, invocation of CSG instruction 18 did not result in any alarm, as described above, execution of secure process portion 330 can proceed. In an embodiment, at 341, control instruction 'Add-to-Signature', ASG instruction 17, can be invoked as stated, for example, in the following pseudo code:

ADD (ADDR_SIGN, STEP_C1)

wherein 'ADDR_SIGN' identifies signature register 120, and 'STEP_C1' is a predefined first step value. Also, for example, a typical process operation such as an operation to have a user securely input a parameter, as shown in FIG. 5A at 342, with process step 'InputParam', can be executed. In order to provide security, secure process portion 330 can further invoke control instruction 'Check-Signature', CSG instruction 18, as illustrated in FIG. 5A at 343. CSG instruction 18 can check, if any irregularity can be identified. CSG instruction 18 can be called as stated in the following pseudo code:

CSG (ADDR_SIGN, SECURE_ENTRY+STEP_C1)

wherein the first operand 'ADDR_SIGN' identifies signature register 120, and wherein the second operand is a sum of the initial instruction signature value 'SECURE_ENTRY' and the first step signature value 'STEP_C1'. The person skilled in the art will understand that in the alternate embodiment briefly described above, the second operand would now need to be a sum of the values 'SECURE_ENTRY', 'STEP_C0', and 'STEP_C1'. Below, when describing similar steps of secure process flow, the alternate embodiment and the value 'STEP_C0' will not be specifically mentioned any more but should be understood. As described above with respect to the control step performed at 332, also at 343, CSG instruction 18 can be invoked to verify that the present signature value is correct and to thereby confirm that execution of secure process portion 330 in preceding process steps such as secure process step 'InputParam' at 342 is valid or legitimate. In effect, execution of CSG instruction 18 can help to confirm that, for example, user input of data was correctly performed without error. Should CSG instruction 18 identify an error condition, CSG instruction 18 can operate so as to branch process flow to another portion of secure process portion 330 that for example, at 344, outputs an alarm.

In some embodiments, secure process portion 330 can include branching, i.e., junctions where process flow goes one way or another. An example is shown in FIG. 5A where, at 345, secure process portion 330 includes a process instruction to check, if a value 'InputParam' is at least the same as or larger than a minimum value 'MinParam'. If the answer is 'YES' then secure process portion 330 flows on in a first process branch 350. If the answer is NO then secure process portion 330 flows on in a second process branch 360.

If process flows into first branch 350, secure process portion 330 can again invoke control instruction 'Add-to-Signature', i.e., ASG instruction 17. In an embodiment, at 351, ASG instruction 17 can be invoked as stated, for example, in the following pseudo code:

ADD (ADDR_SIGN, STEP_C2)

wherein 'ADDR_SIGN' identifies signature register 120, and 'STEP_C2' is a predefined second step value, for example, as expressed by the following pseudo code:

define STEP_C2 0x0065

Further, in branch 350, for example, another typical operation such as another operation to have the user input another parameter can securely be executed, as shown in FIG. 5B, at 352, with process step 'InputParam'. In an embodiment, at 353, control instruction 'Check-Signature', CSG instruction 18, can be invoked to check, if any irregularity can be identified. CSG instruction 18 can be called as stated in the following pseudo code:

CSG (ADDR_SIGN, SECURE_ENTRY+STEP_C1+
       STEP_C2)

wherein the first operand 'ADDR_SIGN' identifies signature register 120, and wherein the second operand is a sum of the initial instruction signature value 'SECURE_ENTRY', first step signature value 'STEP_C1' and second step signature value 'STEP_C2'. Execution of CSG instruction 18 is performed similarly to what is described above with respect to execution of CSG instruction 18, at 332. Thus, CSG instruction 18 can verify the current signature and thereby confirm execution of secure process portion 330, in particular flow of process execution into branch 350 as well as process step 'InputParam', at 352, to be valid or legitimate. Should CSG instruction 18 identify an error condition, CSG instruction 18 can operate so as to branch process flow to another portion of secure process portion 330 that for example, at 354, outputs an alarm.

In order to provide security, secure process portion 330, at 355, can again invoke control instruction 'Add-to-Signature', i.e., ADD instruction 17, as, for example, expressed by the following pseudo code:

ADD (ADDR_SIGN, STEP_C3)

wherein 'ADDR_SIGN' identifies signature register 120, and 'STEP_C3' is a predefined third step value. Another typical process operation such as another process step to have the user input another parameter can securely be executed, as shown in FIG. 5B, at 358, with secure process step 'InputParam'. In some embodiments, control instruction 'Check-Signature', i.e., CSG instruction 18, can be invoked again (not shown) to check in branch 350, if any irregularity can be identified. CSG instruction 18 can be called as stated in the following pseudo code:

CSG (ADDR_SIGN, SECURE_ENTRY+STEP_C1+
       STEP_C2+STEP_C3)

wherein the first operand 'ADDR_SIGN' identifies signature register 120, and wherein the second operand is a sum of the initial instruction signature value 'SECURE_ENTRY', first step instruction value 'STEP_C1', second step instruction signature value 'STEP_C2' and a third step instruction signature value 'STEP_C3' that is predefined similarly to what was described above, for example, with respect to predefined first step instruction signature value 'STEP_C1'.

As described above, at 345, secure process portion 330 includes a process operation to check, if a value 'InputParam' is at least the same as or larger than a minimum value 'MinParam'. If the answer is NO then secure process portion 330 is directed into a second process branch 360. As shown in FIG. 5B, flow of process through second process branch 360 can be similar to flow of process through first process branch 350, albeit in some implementations with different values used as operands. For example, at 361, ASG instruction 17 can be executed using as second operand a fourth step signature value 'STEP_C4'. After, for example, executing at 362 a typical process operation 'InputParam', control instruction 'Check-Signature', i.e., CSG instruction 18, can be invoked as stated in the following pseudo code:

CSG (ADDR_SIGN, SECURE_ENTRY+STEP_C1+
       STEP_C4)

wherein the first operand 'ADDR_SIGN' identifies signature register 120, and wherein the second operand is a sum of the initial instruction signature value 'SECURE_ENTRY', first step signature value 'STEP_C1' and fourth step signature value 'STEP_C4'. Further, in branch 360, for example, yet another typical process operation such as yet another operation to have the user input yet another parameter can securely be executed, as shown in FIG. 5B, at 362, with another secure process operation 'InputParam'. In an embodiment, at 363, control instruction 'Check-Signature', i.e., CSG instruction 18, can be invoked to check, if any irregularity can be identified in process flow. CSG instruction 18 can be called as stated in the following pseudo code:

CSG (ADDR_SIGN, SECURE_ENTRY+STEP_C1+
       STEP_C4)

wherein the first operand 'ADDR_SIGN' identifies signature register 120, and wherein the second operand is a sum of initial instruction signature value 'SECURE_ENTRY', first step signature value 'STEP_C1' and fourth step signature value 'STEP_C4'. Execution of CSG instruction 18 can be performed similarly to what is described above with respect to execution of CSG instruction, at 332. Thus, CSG instruction 18 can verify the current signature value and thereby confirm execution of secure process portion 330, in particular flow of process execution into branch 360 as well as secure process operation 'InputParam', at 362, to be valid or legitimate.

In order to provide security, secure process portion 330 can again, at 367, invoke control instruction 'Add-to-Signature', i.e., ASG instruction 17 as, for example, expressed in the following pseudo code:

ADD (ADDR_SIGN, STEP_C5)

wherein the first operand 'ADDR_SIGN' identifies signature register 120, and 'STEP_C5' is a fifth step signature value predefined similarly to what was described above, for example, with respect to predefined first step signature value 'STEP_C1'. In some embodiments, control instruction 'Check-Signature', i.e., CSG instruction 18 can be invoked again (not shown) to check in second branch 360, if any irregularity can be identified. CSG instruction 18 can be called as stated in the following pseudo code:

CSG (ADDR_SIGN, SECURE_ENTRY+STEP_C1+
       STEP_C4+STEP_C5)

wherein the first operand 'ADDR_SIGN' identifies signature register 120, and wherein the second operand is a sum of the initial instruction signature value 'SECURE_ENTRY', first step signature value 'STEP_C1', fourth step signature value 'STEP_C4' and fifth step signature value 'STEP_C5'. Also, another typical process operation such as another process step to have the user input another parameter can securely be executed, as shown in FIG. 5B, at 368, with secure process step 'InputParam'.

Both branches of process flow 350 and 360 can reunite at 370. Process flow can continue, at 380, with execution of secure process portion 330. More specifically, at 381, secure process portion 330 can again invoke control instruction 'Check-Signature', i.e., CSG instruction 18, to check if any irregularity can be identified prior to proceeding with execution to non-secure process portion 390. CSG instruction 18 can be called as stated in the following pseudo code:

CSG (ADDR_SIGN, SECURE_EXIT)

wherein the first operand 'ADDR_SIGN' identifies signature register 120, and wherein the second operand 'SECURE_EXIT' can be a predefined sum of the initial signature value 'SECURE_ENTRY' and predefined step signature values as were supposed to be added during correct execution of process 300. In one embodiment, in order to arrive at a single value 'SECURE_EXIT' irrespective of process flow through one of multiple possible correct process paths, such as in the above-described embodiments, i.e., either through first branch 350 or through second branch 360, step signature values can be defined so that the sum of step signature values added in any of the multiple paths is equal. For example, step signature values 'STEP_C2', 'STEP_C3', 'STEP_C4"STEP_C5' can be predefined such that the sum of second step signature value 'STEP_C2' and third step signature value 'STEP_C3' added in first branch 350 equals the sum of fourth step signature value 'STEP_C4' and fifth step signature value 'STEP_C5' added in second branch 360. In one embodiment, such definition can be expressed in pseudo code as follows:

| #define | STEP_C2 | 0x0003 |
|---|---|---|
| #define | STEP_C3 | 0x00F5 |
| #define | STEP_C4 | 0x00D7 |
| #define | STEP_C5 | 0x0021 | wherein the values shown are selected merely by way of example and could be defined differently. However, it can be seen that in the present example the sum STEP_C2+STEP_C3=(0003)h+(00F5)h=(00F8)h and the sum STEP_C4+STEP_C5=(00D7)h+(0021)h=(00F8)h are equal. Consequently, irrespective of the branch taken, 'SECURE_EXIT' can be predefined (in the example as the sum (5AD2)h+(00F8)h=(5BCA)h), expressed by pseudo code as follows:
    #define SECURE_EXIT 0x5BCA
Then, if at 381 CSG instruction 18 did not identify any irregularity, process flow can continue in non-secure process portion 390 as shown in FIG. 4.

At least one effect of embodiments presented above can be that flow through secure process portion 330 could be coded with relatively little code, since a call of control instructions, such as a call of control instruction 'Add-to-Signature' (ASG instruction 17) and/or a call of control instruction 'Check-Signature' (CSG instruction 18), does not require as much code as would be required if the operation performed by the respective instruction were set in code. Further savings in code can be made in an embodiment that—as briefly described above—uses a single signature register 120. Since in this case there is only a single signature register, no express reference to that signature register is needed. Consequently, control instruction 'Add-to-Signature' and control instruction 'Check-Signature' can be defined to accept one operand only.

Savings in code can be desirable in order to economically use limited storage in a small processing device such as a computing unit of a micro controller for use in a chipcard. Further, savings in code can help to an increase in processing speed. For these effects, savings in code as achieved by the disclosed embodiments can be particularly desirable in an implementation where the call to 'Add-to-Signature' instruction 17 and 'Check-Signature' instruction 18 or corresponding instructions can be frequent. Unexpectedly, expanding a typical instruction set to include one or both of the control instructions 'Add-to-Signature' and 'Check-Signature' as described herein, and the reduction in code effected in implementations and embodiments described herein, can be very useful to achieve effects of saving.

In some embodiments, a constant step signature value can repeatedly be used in process flow as a step signature value in order to increment the instruction signature value when control instruction 'Add-to-Signature' is invoked. If the constant step signature value is used throughout secure process execution, in some embodiments no other step signature value needs to be defined.

In a variant of some above-described embodiments computing unit 100 is provided with multiple signature registers 120, for example, as illustrated in FIG. 2A, with a first signature register 120a and with a second signature register 120b. Accordingly, first and second initial instruction signature values 'SECURE_ENTRY_1' and 'SECURE_ENTRY_2' can be predefined as stated, for example, in the pseudo code

| #define | SECURE_ENTRY_1 | 0x032A |
|---|---|---|
| #define | SECURE_ENTRY_2 | 0x0846 |

In some embodiments an increment step signature value 'INCR_C' can be predefined for being added, for example, to first signature register 120a, each time control instruction 'Add-to-Signature', i.e., ASG instruction 17, is invoked, such as expressed by the following pseudo code:
    #define INCR_C 0x00DA
    ASG (ADDR_SIGN_1, INCR_C)
wherein the first operand 'ADDR_SIGN_1' identifies first signature register 120a, and 'INCR_C' is the predefined increment step signature value. Further, a decrement step signature value 'DECR_C' can be predefined for being added, for example, to second signature register 120b, each time control instruction 'Add-to-Signature', i.e., ASG instruction 17, is invoked, such as expressed by the following pseudo code:
    #define DECR_C 0xFF26
    ASG (ADDR_SIGN_2, DECR_C)
wherein the first operand 'ADDR_SIGN_2' identifies second signature register 120b, and 'DECR_C' is the predefined decrement step signature value. In the present example, ASG instruction 17 can operate with a modular two byte representation. Thus, decrement step signature value 'DECR_C' can be predefined so as to result in a subtraction of a value equivalent (00DA)h each time ADD instruction 17 is invoked. Other implementations are possible, for example, instruction set 200 can include a third control instruction 'Subtract-Signature' that operates to subtract one operand from a value pointed to by the value loaded from the invoked signature register.

At least one effect of using multiple signature registers 120a, 120b is increased security, since more checks can be implemented, for example in secure process portion 330, than in a case using a single signature register 120. For example, in a variant of secure process portion 330 (not shown), repeatedly invoking ADD instruction 17 in order to increase the first signature value stored in first memory register 152a, and also repeatedly invoking ADD instruction 17 in order to decrease the second signature value stored in second memory register 152b, CSG instruction 18 can also repeatedly be invoked for both signature values; thus correct process flow is 'double-checked'. A 'double-check' to be performed, merely as an example, once in secure process portion 330, is expressed by the following pseudo code:
    CSG (ADDR_SIGN_1, SECURE_ENTRY_1+INCR_C)
    CSG (ADDR_SIGN_2, SECURE_ENTRY_2+DECR_C)
At least one further effect of using multiple signature registers 120a, 120b is that values of signature registers 120a, 120b can be checked against each other. In an embodiment, for example, CSG instruction 18 is invoked as stated in the following pseudo code:
    CSG (ADDR_SIGN_1, ADDR_SIGN_2*)
wherein the first operand 'ADDR_SIGN_1' identifies first signature register 120a. Further, a second value 'ADDR_SIGN_2' is to be loaded from second signature register 120b and can represent a second address value 'ADDRESS_2' of an address in memory unit 150. Thus, the second value 'ADDR_SIGN_2' in second signature register 120b can point to a second memory register 152b in register file 152. Step signature values can be defined so as to provide equal first and second instruction signature values at certain predefined points in secure process portion 330. In a case where values are defined as stated in the example given above for the purpose of illustration, equality of first and second signature values could be achieved after ADD instruction 17 was invoked three times, since, in a modular two byte representation, the sum (032A)h+(00DA)h+ (00DA)h+(00DA)h=(05B8)h and the sum (0846)h+(FF26) h+(FF26)h+(FF26)h=(05B8)h are equal. In a variant, when using multiple signature registers, another control instruction CSG' for comparing signature values could be defined to operate on at least two values that each represent a value stored in an associated signature register, respectively, to point to a respective register, for example to memory register 152a at address 'ADDRESS_1' and to memory register 152b at address 'ADDRESS_2' in register file 152. CSG' instruction 18 could be invoked as stated in the following pseudo code:

CSG' (ADDR_SIGN_1, ADDR_SIGN_2)

After task-related secure process steps in secure process portion 330 have been completed, for example, at 381, as described above, secure process portion 330 can again invoke control instruction 'Check-Signature', i.e., CSG instruction 18, to check, if any irregularity can be identified prior to proceeding with execution to non-secure process portion 390. In the present case, however, a double check can be performed by invoking CSG instruction 18 to check both, the first signature value and the second signature value, as stated by the following pseudo code:

CSG (ADDR_SIGN_1, SECURE_EXIT_1)
CSG (ADDR_SIGN_2, SECURE_EXIT_2)

In one embodiment, the predefined point in process flow where first and second signature values are supposed to be equal, is provided after all task-related secure process steps in secure process portion 330 have been completed, for example, at 381. In such a case double-check can be performed by invoking CSG instruction 18 to check both, the first signature value and the second signature value against a same value, as stated in the following pseudo code:

CSG (ADDR_SIGN_1, SECURE_EXIT)
CSG (ADDR_SIGN_2, SECURE_EXIT)

In accordance with the embodiments disclosed herein, frequent invocation of control instruction 'Add-to-Signature' and control instruction 'Check-Signature' comes at little expense from a user's point of view focussing on task processing. In effect, to achieve a same task-related performance as a conventionally coded implementation, embodiments disclosed herein enable implementation of security related control instructions as 'Add-to-Signature' instruction 17 and 'Check-Signature' instruction 18 that were described above. Thus, embodiments disclosed herein can provide an increased level of security. Or, at a same level of security as a conventionally coded implementation, embodiments disclosed herein can provide an increased processing speed. The person skilled in the art can contemplate further variants. For example, computing unit 100 could include multiple signature registers, and instruction set 200 could include multiple subsets of control instructions such as 'Add-to-Signature' and 'Check-Signature' wherein each subset of control instruction would only use one signature register specifically assigned to the respective subset. An effect could be that, as briefly discussed above, the control instructions would not require any operand to point out the signature register to be used in execution of the instruction.

Thus, further code savings could be made. In another variant an instruction could be defined to use some or all of the multiple signature register. In such an implementation, one call to the instruction could be used to update or check instruction multiple signature values.

In an aspect a method is disclosed herein comprising providing a processor configured to verify execution of at least one task expressed by high-level instructions and providing a hardware component. In some embodiments the method comprises directly accessing at least one hardware component to store an address where a signature value is stored and directly accessing the at least one hardware component to modify the stored signature value to generate a verification value. In some embodiments the method comprises storing the generated verification value at the address as an updated signature value.

In another embodiment a method is provided comprising coupling a processor to a storage module and using the processor to execute a first function expressed by one or more instructions executable by the processor. In some embodiments executing the first function causes the processor to directly access at least one hardware component coupled to the processor to store an address in the storage module where a signature value is stored. In some embodiments the processor can be used to execute at least one second function expressed by one or more instructions executable by the processor called by the first function. Executing the one second function can comprise sending, by the first function to the second function, an identification value. In some embodiments the method can comprise directly accessing the at least one hardware component to modify the stored signature value stored at the address in the storage module using the identification value to generate an updated signature value as a verification value and verifying execution of the second function based on a comparison of the generated verification value and another verification value received via the second function.

In yet another embodiment a method is provided comprising coupling a processor to a storage module and using the processor to execute a first function expressed by one or more instructions executable by the processor. In some embodiments executing the first function comprises executing at least one second function comprising one or more instructions executable by the processor and called by the first function and receiving, by the second function and from the first function, an identification value. Some embodiments comprise directly accessing the at least one hardware component to modify the stored signature value using the identification value to generate an updated signature value as a verification value and sending the generated verification value from the second function to the first function, to verify execution of the second function by the first function.

In an aspect a method is disclosed herein for use in data processing. An embodiment of the method comprises providing an arithmetic unit configured to perform any one in a set of operations. An embodiment comprises providing a storage medium, wherein the storage medium is coupled to the arithmetic unit and configured to store instruction code that when carried out by the arithmetic unit performs associated operations comprised in the set of operations to process a task. An embodiment comprises providing a process register configured to receive process data. An embodiment comprises providing a control register configured to hold control data. An embodiment comprises providing in the set of operations, a control operation to provide process control, the control operation to operate on an operand that is coupled to the control data. In an embodiment the operand is a value stored at an address derived from the control data. In an embodiment the operand is coupled to the control data in that the control data is the address. An embodiment comprises receiving, at the address, control operation data resultant from the control operation, the control operation data henceforth to represent the value. In an embodiment the control operation is to also operate on another operand. In an embodiment the another operand is predetermined. An embodiment comprises providing another control register configured to hold another control data, wherein the another operand is another value stored at another address derived from said another control data. An embodiment comprises providing another control operation to direct further program flow depending on an outcome of a comparison of the operand to the another operand. In an embodiment the further program flow is directed into an error program branch if the outcome is indicative of the operand being unequal to the another operand.

In an aspect a system is disclosed herein for use in data processing. An embodiment comprises an arithmetic unit configured to perform any one in a set of operations. An embodiment comprises a storage medium, wherein the storage medium is coupled to the arithmetic unit and configured to store instruction code that when carried out by the arithmetic unit performs associated operations, comprised in the set of operations, to process a task. An embodiment comprises a process register configured to receive process data. An embodiment comprises a control register configured to hold control data. In an embodiment the control register is configured to only hold the control data. In an embodiment the system provides, in the set of operations, a control operation for process control, the control operation to operate on an operand that is coupled to the control data. In an embodiment the control data is an address. In an embodiment the operand is coupled to the control data in that the operand is a value stored at the address. In an embodiment the system is configured to receive, at the address, control operation data resultant from the control operation, the control operation data to henceforth represent the value. An embodiment comprises another control register configured to hold another control data, wherein the another operand is another value stored at another address derived from said another control data. In an embodiment the set of operations further comprises another control operation to direct further process flow depending on an outcome of a comparison of the operand to another operand. In an embodiment the another control operation is to direct further process flow into an error process branch if the outcome is indicative of the operand being unequal to the another operand. In an embodiment the control register is physically protected from unauthorised readout.

In an aspect a device is disclosed that comprises a processor and a hardware component. The processor can be configured to verify execution of at least one task expressed by high-level instructions. In some embodiments a single high-level instruction, in other embodiments a plurality of high-level instructions, when executed, is configured to cause the processor to directly access at least one hardware component to store an address where a signature value is stored, directly access the at least one hardware component to modify the stored signature value to generate a verification value and to store the generated verification value at the address as an updated signature value. In some embodiments the processor can be configured to directly access the at least one hardware component based on executing machine-level instructions associated with the single high-level instruction that cause the processor to access the at least one hardware component without any additional machine level instructions. In some embodiments the at least one hardware component comprises a register. In some embodiments the register is dedicated to storing one or more addresses where the signature value and/or the verification value is stored.

In an aspect a device is disclosed that comprises a processor coupleable (i.e. configured to be coupled) to a storage module and configured to execute a first function expressed by one or more instructions executable by the processor, wherein executing the first function causes the processor to directly access at least one hardware component coupled to the processor to store an address in the storage module where a signature value is stored. In some embodiments the processor can further be caused to execute at least one second function expressed by one or more instructions executable by the processor called by the first function, and wherein executing the one second function comprises sending, by the first function to the second function, an identification value. In some embodiments the processor can further be caused to directly access the at least one hardware component to modify the stored signature value stored at the address in the storage module using the identification value to generate an updated signature value as a verification value and to verify execution of the second function based on a comparison of the generated verification value and another verification value received via the second function.

In an aspect a device is disclosed that comprises a processor, wherein the processor is coupleable to a storage module. The processor can be configured to execute a first function comprising one or more instructions executable by the processor. In some embodiments executing the first function causes the processor to execute at least one second function comprising one or more instructions executable by the processor and called by the first function, receive, by the second function and from the first function, an identification value, directly access the at least one hardware component to modify the stored signature value using the identification value to generate an updated signature value as a verification value, and send the generated verification value from the second function to the first function, to verify execution of the second function by the first function.

In an aspect a non-transitory computer-readable medium storing instruction code thereon is disclosed that, when executed, causes one or more processors to perform at least one task expressed by high-level instructions comprising directly accessing at least one hardware component to store an address where a signature value is stored, directly accessing the at least one hardware component to modify the stored signature value to generate a verification value, and storing the generated verification value at the address as an updated signature value.

In an aspect a non-transitory computer-readable medium storing instruction code thereon is disclosed that, when executed, causes one or more processors coupled to a storage module to perform execution of at least one task expressed by high-level instructions. In some embodiments the execution comprises executing a first function expressed by one or more instructions executable by the processor, wherein executing the first function causes the processor to directly access at least one hardware component coupled to the processor to store an address in the storage module where a signature value is stored. In some embodiments the execution comprises executing at least one second function expressed by one or more instructions executable by the processor called by the first function, wherein executing the one second function comprises sending, by the first function to the second function, an identification value. In some embodiments the execution comprises directly accessing the at least one hardware component to modify the stored signature value stored at the address in the storage module using the identification value to generate an updated signature value as a verification value. In some embodiments the execution comprises verifying execution of the second function based on a comparison of the generated verification value and another verification value received via the second function.

In an aspect a non-transitory computer-readable medium storing instruction code thereon is disclosed that, when executed, causes one or more processors coupled to a storage module to perform executing a first function expressed by one or more instructions executable by the processor, wherein executing the first function comprises executing at least one second function comprising one or more instructions executable by the processor and called by the first function, receiving, by the second function and from the first function, an identification value, directly accessing the at least one hardware component to modify the stored signature value using the identification value to generate an updated signature value as a verification value, and sending the generated verification value from the second function to the first function, to verify execution of the second function by the first function.

In an aspect a non-transitory computer-readable medium is disclosed herein that stores instruction code thereon. The instructions, when executed, cause one or more processors to operate for use in data processing. When executed, the code causes one or more processors to perform process operations forming part of a set of operations, the process operations to process a task and to write process data into a process register, and to perform a control operation forming part of the set of operations, the control operation to operate on an operand that is coupled to control data held in a control register. In an embodiment the control data is an address. In an embodiment the operand is a value stored at the address. In an embodiment the instruction code, when executed, causes the one or more processors to write control operation data resultant from the control operation at the address, the control operation data to henceforth represent the value. In an embodiment the control operation is to also operate on another operand. In an embodiment the another operand is predetermined or the another operand is coupled to another control data held in another process register. In an embodiment the instruction code, when executed, causes the one or more processors to direct further process flow depending on an outcome of a comparison of the operand to the another operand. In an embodiment the further process flow is directed into an error process branch if the outcome is indicative of the operand being unequal to the another operand.

Exemplary implementations/embodiments discussed herein may have various components collocated; however, it should be appreciated that the components of the arrangements may be combined into one or more apparatuses.

Although the disclosure has been shown and described with respect to one or more implementations, equivalent alterations and modifications will occur to others skilled in the art based upon a reading and understanding of this specification and the annexed drawings. Permutations and combinations of the above-disclosed concepts are also contemplated as falling within the scope of the disclosure. The disclosure includes all such modifications and alterations and is limited only by the scope of the following claims. In particular with regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

The implementations, arrangements, procedures and protocols of the described implementations may be implemented on a special purpose computer, a programmed microprocessor or micro-controller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus that is capable of implementing the methodology described and illustrated herein may be used to implement the various communication methods, protocols and techniques according to the implementations.

Furthermore, the disclosed embodiments, implementations and procedures, with the exception of signature registers, may be readily implemented in software using object or object-oriented software development environments that provide a portable source code that can be used on a variety of computer or workstation platforms. Alternatively, the disclosed arrangements may be implemented partially or fully in hardware using standard logic circuits or VLSI design.

Moreover, the disclosed procedures may be readily implemented in software that can be stored on a non-transitory computer-readable storage medium, executed on a programmed general-purpose computer with the co-operation of a controller and memory, a special purpose computer, a microprocessor, or the like. In these instances, the arrangements and procedures of the described implementations may be implemented as a program embedded on a personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system.

The implementations herein are described in terms of exemplary embodiments. However, it should be appreciated that individual aspects of the implementations may be separately claimed and one or more of the features of the various embodiments may be combined. In the above description of exemplary implementations, for purposes of explanation, specific numbers, materials configurations, and other details are set fourth in order to better explain the invention, as claimed. However, it will be apparent to one skilled in the art that the claimed invention may be practised using different details than the exemplary ones described herein. In other instances, well-known features are omitted or simplified to clarify the description of the exemplary implementations. Thus, although the disclosure has been shown and described with respect to one or more implementations, equivalent alterations and modifications will occur to others skilled in the art based upon a reading and understanding of this specification and the annexed drawings.

The inventors intend the described exemplary embodiments/implementations to be primarily examples. The inventors do not intend these exemplary embodiments/implementations to limit the scope of the appended claims. Rather, the inventors have contemplated that the claimed invention might also be embodied and implemented in other ways, in conjunction with other present or future technologies. Note that the order in which the embodiments/implementations and methods/processes are described is not intended to be construed as a limitation, and any number of the described implementations and processes may be combined.

Moreover, the word 'exemplary' is used herein to mean serving as an example, instance, or illustration. Any aspect or design described herein as 'exemplary' is not necessarily to be construed as preferred or advantageous over other aspects or designs. Rather, use of the word exemplary is intended to present concepts and techniques in a concrete fashion. The term 'techniques', for instance, may refer to one or more devices, apparatuses, systems, methods, articles of manufacture, and/or computer-readable instructions as indicated by the context described herein.

In addition, the articles 'a' and 'an' as used in this application and the appended claims are to be construed to mean 'one or more'. As used in this application, the term 'or' is intended to mean an inclusive 'or' rather than an exclusive 'or'. That is, unless specified otherwise or clear from context, 'X employs A or B' is intended to mean any of the natural inclusive permutations. That is, if X employs A; X employs B; or X employs both A and B, then 'X employs A or B' is satisfied under any of the foregoing instances. Furthermore, to the extent that the terms 'includes', 'having', 'has', 'with', or variants thereof are used in either the detailed description or the claims, such terms are intended to be inclusive in a manner similar to the term 'comprising'.

The term 'processor-readable media' includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms 'coupled' and 'connected' may have been used to describe how various elements interface. Such described interfacing of various elements may be either direct or indirect.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A system, comprising:
    an arithmetic unit configured to perform any one in a set of operations;
    a storage medium coupled to said arithmetic unit and configured to store instruction code that when carried out by said arithmetic unit performs associated operations, comprised in said set of operations, to process a task; and
    a control register configured to hold control data unrelated to processing the task,
    wherein said system provides, in said set of operations, a control operation for process control, said control operation to operate on an operand that is coupled to said control data, and
    wherein said system further comprises a process register configured to receive process data, the process data being generated or used when performing the associated operations to process the task.

2. The system of claim 1, wherein said control data is an address.

3. The system of claim 2, wherein said operand is a value stored at said address.

4. The system of claim 3, wherein said system is configured to receive, at said address, control operation data resultant from said control operation, said control operation data to henceforth represent said value.

5. The system of claim 1, wherein said set of operations further comprises another control operation to direct further process flow depending on an outcome of a comparison of said operand to another operand.

6. The system of claim 5, wherein said another control operation is to direct further process flow into an error process branch if said outcome is indicative of said operand being unequal to said another operand.

7. The system of claim 1, wherein said system is provided in an integrated circuit.

8. The system of claim 7, wherein said control register is physically protected from unauthorised readout.

9. A non-transitory computer-readable medium storing instruction code thereon that, when executed, causes one or more processors to:
    perform process operations forming part of a set of operations, said process operations to process a task and to write process data into a process register, and
    perform a control operation forming part of said set of operations, said control operation to operate on an operand that is coupled to control data held in a control register, wherein the control operation is unrelated to processing the task.

10. The non-transitory computer-readable medium of claim 9, wherein said control data is an address, and wherein said operand is a value to be stored at said address.

11. The non-transitory computer-readable medium of claim 10, wherein said instruction code, when executed, causes said one or more processors to write control operation data resultant from said control operation at said address, said control operation data to henceforth represent said value.

12. The non-transitory computer-readable medium of claim 10, wherein said control operation is to also operate on another operand.

13. The non-transitory computer-readable medium of claim 12, wherein said another operand is predetermined or coupled to another control data held in another process register.

14. The non-transitory computer-readable medium of claim 10, wherein said instruction code, when executed, causes said one or more processors to direct further process flow depending on an outcome of a comparison of said operand to said another operand.

15. The non-transitory computer-readable medium of claim 14, wherein said further process flow is directed into an error process branch if said outcome is indicative of said operand being unequal to said another operand.

\* \* \* \* \*